(12) United States Patent
Rice

(10) Patent No.: US 6,879,435 B2
(45) Date of Patent: Apr. 12, 2005

(54) FIBER AMPLIFIER HAVING AN ANISOTROPIC NUMERICAL APERTURE FOR EFFICIENT COUPLING OF PUMP ENERGY

(75) Inventor: Robert R. Rice, Simi Valley, CA (US)

(73) Assignee: The Boeing Company, Seattle, WA (US)

( * ) Notice: Subject to any disclaimer, the term of this patent is extended or adjusted under 35 U.S.C. 154(b) by 366 days.

(21) Appl. No.: 10/090,296

(22) Filed: Mar. 4, 2002

(65) Prior Publication Data

US 2003/0165008 A1 Sep. 4, 2003

(51) Int. Cl.[7] .............................. H01S 3/00
(52) U.S. Cl. ................................ 359/341.1
(58) Field of Search ..................... 359/341.3; 385/126

(56) References Cited

U.S. PATENT DOCUMENTS

| | | |
|---|---|---|
| 4,815,079 A | 3/1989 | Snitzer et al. |
| 6,115,526 A | 9/2000 | Morse |
| 6,160,824 A | 12/2000 | Meissner et al. |

FOREIGN PATENT DOCUMENTS

EP 001076249 A1 * 2/2001

OTHER PUBLICATIONS

*Research on Optical Fiber Amplifier for Next-Generation Optical Inter-Orbit Communications*; Office of Research and Development; NASDA Report / NEWS; Jan. 1999; pp. 1–3; vol. 79; <http://www.nasda.go.jp/Home/News/News-e/79fiber.htm>.

* cited by examiner

Primary Examiner—Mark Hellner
(74) Attorney, Agent, or Firm—Alston & Bird LLP (57) ABSTRACT

An optical fiber amplifier has an anisotropic numerical aperture to optimally couple pump energy into the pump core of a dual-clad fiber. The optical fiber consists of a dual-clad fiber having a longitudinally extending inner core, an outer core surrounding the inner core, and a cladding layer at least partially surrounding the outer core. The outer core is capable of transmitting pump energy to thereby amplify signals propagating through the inner core. Further, the outer core is capable of accepting pump energy within a first range of acceptance angles in a first direction and within a second range of acceptance angles in a second direction that is perpendicular to the first direction. The outer core and the cladding layer are structured such that a numerical aperture of the fiber amplifier in the first direction is different than the numerical aperture of the fiber amplifier in the second direction.

28 Claims, 6 Drawing Sheets

FIBER AMPLIFIER HAVING AN ANISOTROPIC NUMERICAL APERTURE FOR EFFICIENT COUPLING OF PUMP ENERGY

FIELD OF THE INVENTION

The present invention relates generally to optical fiber amplifiers and, more particularly, to techniques for coupling pump energy into the pump core layer of an optical fiber amplifier.

BACKGROUND OF THE INVENTION

Fiber amplifiers are commonly used in many applications, including telecommunications applications and high power military and industrial fiber optic applications. For example, both U.S. Pat. No. 5,946,130, issued Aug. 31, 1999 to Rice and U.S. Pat. No. 5,694,408 issued Dec. 2, 1997 to Bott et al. describe many such applications in which fiber amplifiers are employed including the processing of materials, laser weapon and laser ranging systems, and a variety of medical and other applications.

Figure 1A:
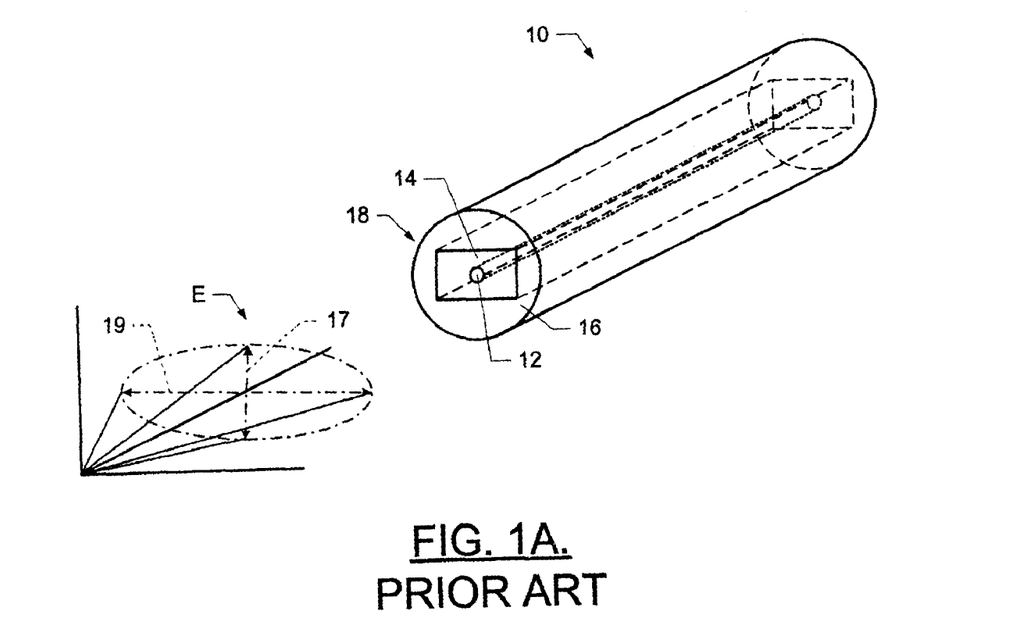
FIGS. 1A an 1B are an orthographic view and a front view, respectively, of a conventional end-pumped dual-clad fiber.
Figure 1B:
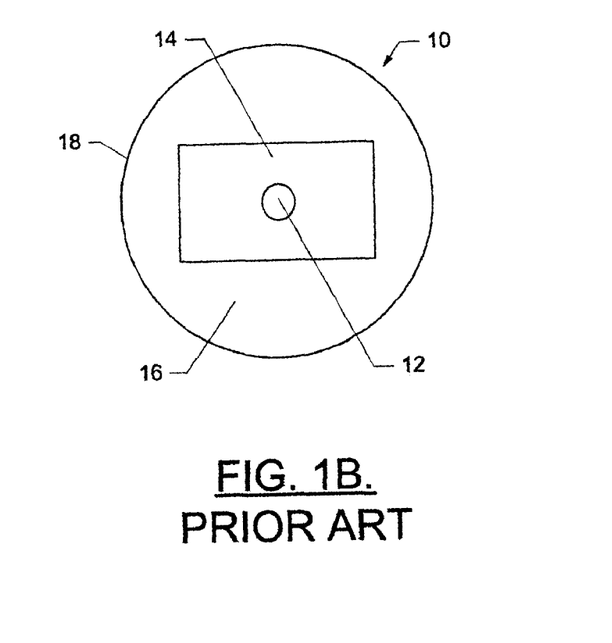

Optical fiber amplifiers are designed to increase the power output levels of the signals propagating therealong. One conventional optical fiber amplifier design is an end-pumped dual-clad fiber, such as that described in U.S. Pat. No. 4,815,079 issued Mar. 21, 1989 to Snitzer et al. Referring to FIGS. 1A and 1B, the dual-clad fiber 10 has a single mode signal core 12, a multi-mode pump core 14 surrounding the signal core, and an outer cladding layer 16 surrounding the pump core for confining pump energy within the pump core, such that signals propagating through the signal core are amplified. The signal core will typically be doped with one or more rare earth elements such as, for example, ytterbium, neodymium, praseodymium, erbium, holmium or thulium.

In operation, pump energy is coupled into the pump core 14 at the input end 18 of the fiber. The pump energy then propagates along through the pump core until it is absorbed by the dopant in the signal core 12, thus amplifying signals propagating through the signal core. Although dual-clad fibers 10 can have different sizes, one typical dual-clad fiber includes a signal core that has a diameter of 8–10 $\mu$m and a pump core that has cross-sectional dimensions of 100–300 $\mu$m. End-pumped dual-clad fiber amplifiers of this size can typically reach fiber energy power levels of 115 W.

Due to the nature of optical radiation, the pump energy (shown as E) has different characteristics in two characteristic directions. As the pump energy propagates at least a portion of the pump energy diverges in a fast direction 17, and at least a portion of the pump energy diverges in a slow direction 19, with the pump energy diverging in each direction at a different rate. As such, the pump energy is typically coupled into the pump core using a fast axis lens that collimates the pump energy diverging in the direction established by the fast axis. But because the pump energy diverges in each direction at different rates, the fast axis lens generally does not adequately focus the pump energy diverging in the slow direction. Conventionally, no effort is made to focus the pump energy diverging in the slow direction. And as such, the net effect produces a distribution of pump energy at the input end of the fiber that unequally diverges in each direction which, in turn, reduces the efficiency of pump energy coupled into the pump core.

Considering the unequal divergence of pump energy as the pump energy is coupled into the pump core, a number of different approaches have been taken to otherwise allow the largest amount of pump energy as possible to be coupled into the end of the fiber. For example, one approach that has been taken is to design a fiber having as large a pump core as practical. But because of the requirement to maintain a significant absorption of pump energy per unit length of fiber, the size of the pump core is limited.

In addition to increasing the size of the pump core to couple the largest amount of pump energy into the end of the fiber, a number of alternative pumping techniques have been developed. For example, U.S. Pat. No. 5,854,865 issued Dec. 29, 1998 to Goldberg discloses a fiber amplifier having a v-shaped notch cut into the pump core through the cladding layer. Pump energy can then be reflected or refracted from one of the angled faces of the v-shaped notch so as to be injected directly into the pump core. Another technique involves the use of a fiber amplifier having portions of the cladding and the pump core removed. The fiber amplifier is then spooled between two reflective elements and pump energy introduced into the region between the reflective elements. The pump energy is then repeatedly reflected by the reflective elements in order to amplify signals propagating through the signal core.

While the current techniques have achieved some level of success, they still do not address the issue of the unequal diverging of pump energy into the fiber. And as such, the current techniques do not most efficiently couple pump energy into the pump core. Therefore, it would be desirable to design a fiber amplifier that accommodated the pump energy diverging in the slow direction, as well as the pump energy diverging in the fast direction, to thereby couple pump energy into the pump core more efficiently than current techniques.

SUMMARY OF THE INVENTION

An optical fiber amplifier is therefore provided that has an anisotropic numerical aperture to optimally couple pump energy into the pump core of a dual-clad fiber. The optical fiber amplifier of the present invention consists of a dual-clad fiber having a longitudinally extending inner (e.g., signal) core, and an outer (e.g., pump) core surrounding the inner core and extending longitudinally therealong. The fiber amplifier further includes a cladding layer at least partially surrounding the outer core. The outer core is capable of transmitting pump energy such that the pump energy at least partially amplifies signals propagating through the inner core.

The outer core is further capable of accepting pump energy within a first range of acceptance angles in a first direction and within a second range of acceptance angles in a second direction that is perpendicular to the first direction. In this regard, a portion of the pump energy diverges in the first direction and a portion of the pump energy divergi in the second direction. Both portions diverging prior to being accepted by the outer core, with the portion of pump energy that diverges in the second direction diverging more than the portion of pump energy diverging in the first direction. To offset the effects of the different rates of divergence of the pump energy, the outer core and the cladding layer are structured such that the numerical aperture of the fiber amplifier in the first direction is different than the numerical aperture of the fiber amplifier in the second direction.

The fiber amplifier can define first and second orthogonal axes extending through the inner core and in the first and second directions, respectively. Also, the fiber amplifier can be considered to include first and second mutually exclusive segments which include and surround the first and second orthogonal axes, respectively. In order to tailor the numerical aperture to be different in different directions, the outer core within the second segment of the fiber amplifier can at least partially interface with a material that has a refractive index different than the refractive index of said cladding. In another embodiment, the material is disposed radially within the outer core, such as in voids defined by the outer core, in at least two locations on opposite sides of said inner core. Further, the cladding layer can be disposed entirely within the first segment. To achieve the anisotropic numerical aperture, then, the material preferably has refractive index smaller than the refractive index of the outer core and the refractive index of the cladding layer.

According to another embodiment, the cladding layer defines at least one opening through which the outer core is exposed. In this embodiment, the fiber amplifier further includes at least one prism disposed within a respective opening defined by the cladding layer and extending laterally outward therefrom. The prisms can each include a first face disposed proximate the outer core, a second face through which pump energy is injected, with the second face extending outwardly from one end of the first face at an acute angle therefrom. Further, the prisms can each include a third face extending outwardly from one end of the first face at an acute angle from the first face. To couple pump energy into the fiber amplifier according to this embodiment, the outer core is capable of accepting pump energy through the prisms. And further to prevent a portion of the pump energy reflecting off the surface of the outer core from escaping from the third face of the prism, the prism can include a reflective surface disposed proximate the third face. Additionally, or alternatively, the second face can include an integral lens for directing pump energy entering the prism through the second face.

The fiber amplifier of the present invention therefore provides an anisotropic numerical aperture to thereby efficiently couple pump energy into the fiber amplifier. As pump energy propagates, portions of the pump energy diverge in a fast direction and in a slow direction. Conventionally, a fast axis collimation lens has focused the portion diverging in the fast direction without regard to the portion of the pump energy diverging in the slow direction. By having an anisotropic numerical aperture, the fiber amplifier of the present invention accommodates the pump energy diverging in the slow direction. And with conventional techniques of coupling the pump energy diverging in the fast direction, the fiber amplifier of the present invention couples pump energy into the pump core more efficiently than current techniques.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
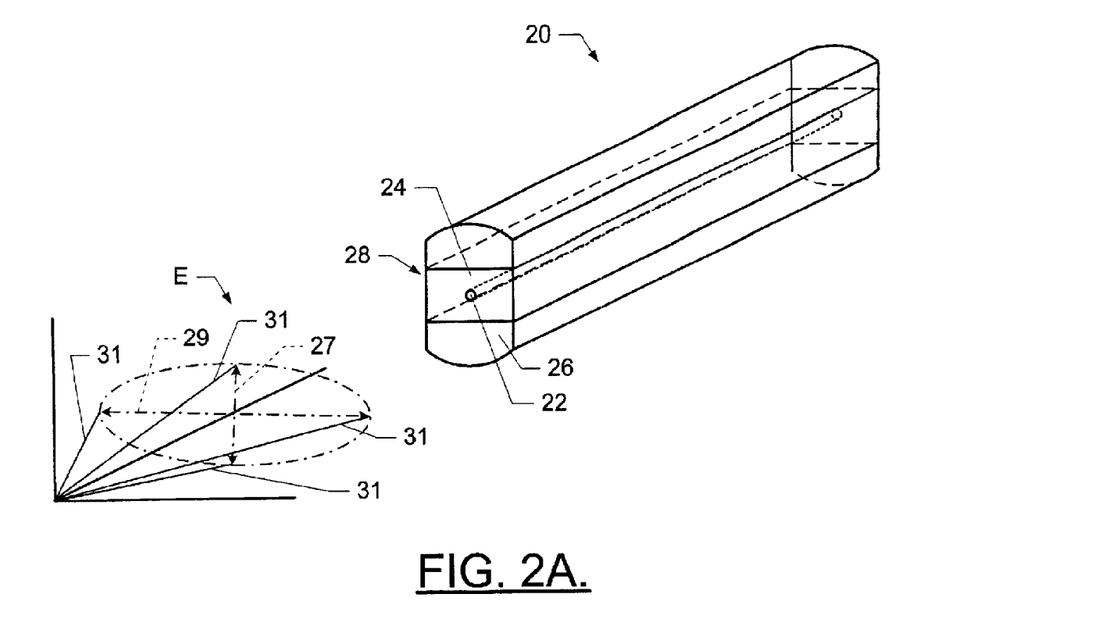
FIGS. 2A and 2B are an orthographic view and a front view, respectively, of an optical fiber amplifier with an anisotropic numerical aperture according to one embodiment of the present invention.
Figure 2B:
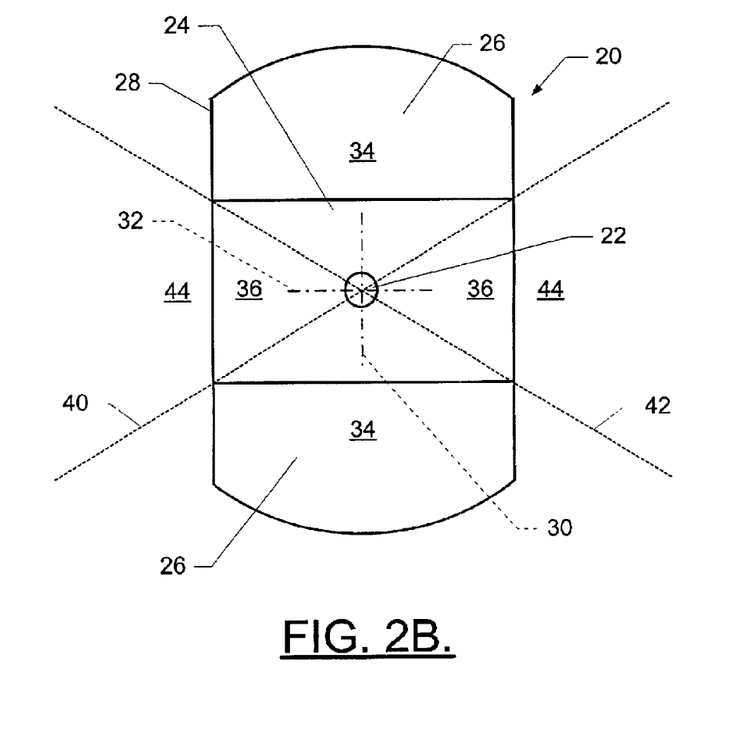

Reference is now made to the drawings, and in particular FIGS. 2A and 2B, which illustrate an orthographic view and a front view, respectively, of an optical fiber amplifier 20 with an anisotropic numerical aperture according to one embodiment of the present invention. The fiber amplifier has a dual-clad fiber that includes an inner core 22 doped with one or more rare earth elements such as, for example, ytterbium, neodymium, praseodymium, erbium, holmium or thulium. The inner core is designed to support the propagation and amplification of signals in a single mode and is therefore also known as a single mode signal core. The dual-clad fiber of the fiber amplifier also has an outer core 24 at least partially surrounding the inner core. The outer core generally supports the propagation of multiple modes of pump signals and is therefore also known as a multi-mode pump core. In addition, the outer core is preferably designed to have a lower refractive index $N_p$ than the inner core in order to confine the signals within the inner core. For example, both the inner and outer cores can be formed of silica with the inner core doped with germanium, in addition to a rare earth element, in order to have a greater refractive index $N_c$. The dual-clad fiber of the fiber amplifier 20 also includes a cladding layer 26 that at least partially surrounds the outer core 24. While the cladding layer can be formed of various materials, the cladding layer is typically formed of a material, such as a polymer, that has a refractive index $N_{cl}$ that is lower than the refractive index of the outer core $N_p$. Additionally, the cladding layer can be formed of glass, as is currently being developed, without departing from the spirit and scope of the present invention.

According to the present invention, the fiber amplifier 20 defines a first axis and 30 and a second axis 32 that is orthogonal to the first axis. The first and second axes extend through the inner core 22 and the outer core 24. The fiber amplifier of the present invention advantageously has an anisotropic numerical aperture and, as such, the fiber amplifier can be considered to have first and second mutually exclusive segments 34 and 36. Preferably the first and second segments include and surround the first and second orthogonal axes, respectively. As illustrated, in a preferred embodiment, the first and second segments are defined by lines 40 and 42 that bisect one another and the first and second orthogonal axes within the inner core and, more typically, at the actual longitudinal axis defined by the fiber amplifier.

Within the first segment 34 of the fiber amplifier 20, the outer core 26 interfaces with the cladding layer 26 to thereby define a first numerical aperture, $NA_1$, which can be seated according to the following:

$$NA_1 = \sqrt{N_p^2 - N_{cl}^2} \tag{1}$$

In equation (1), $N_p$ is the refractive index of the outer core, and $N_{Cl}$ is the refractive index of the cladding layer. In the second segment 36 of the fiber amplifier, the outer core at least partially interfaces with a material 44, such as air, to thereby define a second numerical aperture, $NA_2$, which can be defined according to equation (2) as follows:

$$NA_2 = \sqrt{N_p^2 - N_m^2} \tag{2}$$

In equation (2), $N_m$ is the refractive index of the material which, when the material comprises air, equals one. To provide to fiber amplifier wit an anisotropic numerical aperture, refractive index of the cladding layer is different than the refractive index of the material.

Figure 3:
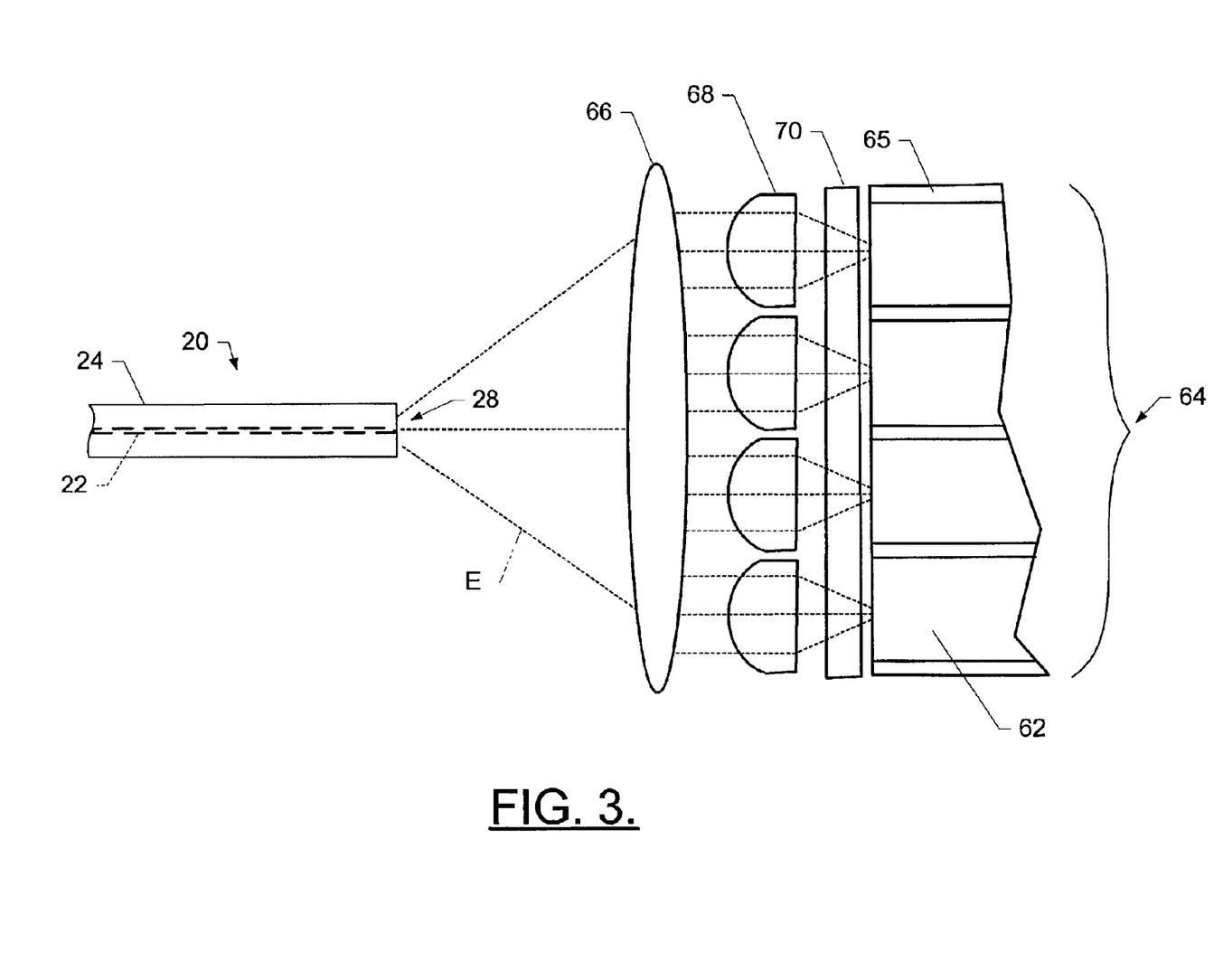
FIG. 3 is a schematic top view of one embodiment of the present invention that includes a pump source comprised of multiple emitter laser diodes, and associated collimation and focus optics.

In operation, a diode laser pump source injects pump energy (shown as E) into a pump face 28 of the fiber amplifier 20. The pump energy comprises a plurality of pump rays 31, four of which are illustrated, and can be provided by a variety of means. Referring to FIG. 3, for example, placed at a distance from the fiber amplifier 20, typically facing the pump face 28 of the fiber amplifier, a diode laser pump source provides pump energy E to the fiber amplifier. The diode laser pump source can be any one of a variety of diode laser configurations, such as individual single-emitter laser diodes 62, multiple emitter laser diodes 64 formed within a diode pump bar 65, or two-dimensional arrays of bars of multiple emitter laser diodes. To slow or halt the divergence of the pump energy, a fast axis collimation lens 68 can be disposed between the laser diodes and the fiber amplifier. However, because the pump rays diverge at different rates from the laser diode 62, as discussed below, an additional collimation lens, a slow axis lens 70, can additionally be utilized to further account for the divergence of the pump rays in the slow direction. Additionally, in order to focus the pump energy onto the fiber amplifier, a focus lens 66 can be disposed between the laser diodes and the fiber amplifier.

As stated above, spaced at a distance from the fiber amplifier 20, one or more laser diodes 62 can provide pump energy to the pump face 28 of the fiber amplifier. As such, the distance between the laser diodes and the pump face can vary. Set at a distance relatively close to the fiber amplifier, only collimation optics, such as a fast axis lens 68 and a slow axis lens 70 may be required, with a focus lens 66 being unnecessary. The collimation optics can be attached to the body of the diode pump bar 65 so as to be aligned with a respective laser diode.

The pump source need not be immediately adjacent to the pump face 28 of the fiber amplifier 20. Instead, the pump source can be located some distance from the fiber amplifier. In this regard, a multi-mode fiber pig tail may be employed. In multi-mode fiber pig tail configurations, the laser diodes are positioned at a remote location from the fiber amplifier and a multi-mode pump coupling fiber is disposed between the laser diodes and the fiber amplifier to guide the pump energy to the fiber amplifier. In this regard, an aspheric high numerical aperture coupling lens can be positioned between the pump coupling fiber and the fiber amplifier to provide additional focus to the pump energy as it is directed to the fiber amplifier. Alternatively, a graded index lens can be disposed between the pump coupling fiber and the fiber amplifier. In this configuration, the refractive index of the graded index lens can be tailored to collimate and/or focus the pump energy as it is directed to the fiber amplifier.

Regardless of the type of pump source or the optics utilized to deliver the pump energy E, the pump energy can impinge upon the pump face 28 of the fiber amplifier 20 at any of a wide range of angles. In this regard, portions of the pump energy generally diverge in a fast direction 27 and in a slow direction 29, with the pump energy diverging in the slow direction more than in the fast direction by the time the pump energy impinges upon the pump face. Typically, the fast direction aligns with the first axis 30 defined by the fiber amplifier, which is perpendicular to the plane of the source of the pump energy (see FIG. 3). The slow direction, on the other hand, typically aligns with the second axis 32 defined by the fiber amplifier, which is parallel to the plane of the source of the pump energy. As used herein pump rays diverging in the fast direction will be referred to as the fast component $E_f$ of the pump energy, and pump rays diverging in the slow direction will be referred to as the slow component $E_s$ of the pump energy. Thus, as shown in FIGS. 4A and 4B, respectively, the fast component may have an angle of incidence at the pump face up to or equal to angle $\alpha_f$, and the slow component may have an angle of incidence at the pump face up to or equal to $\alpha_s$.

Within the fiber amplifier 20, the pump energy E propagates lengthwise along the dual-clad fibers. As the pump energy propagates, the pump energy is guided or constrained by the cladding layer 26 such that the pump energy can be at least partially absorbed by the inner core 22 in order to amplify the signals propagating therethrough. Because portions of the fast and slow components impinge upon the pump face 28 of the fiber amplifier at respective angles, each component typically propagates within the outer core 24 in a zig-zag fashion. More specifically, the fast component $E_f$ of the pump energy generally propagates in a zig-zag fashion about the first axis 30 defined by the fiber amplifier, as shown in FIG. 4A. Similarly, the slow component $E_s$ of the pump energy propagates in a zig-zag fashion about second axis 32 defined by the fiber amplifier, as shown in FIG. 4B.

Figure 4A:
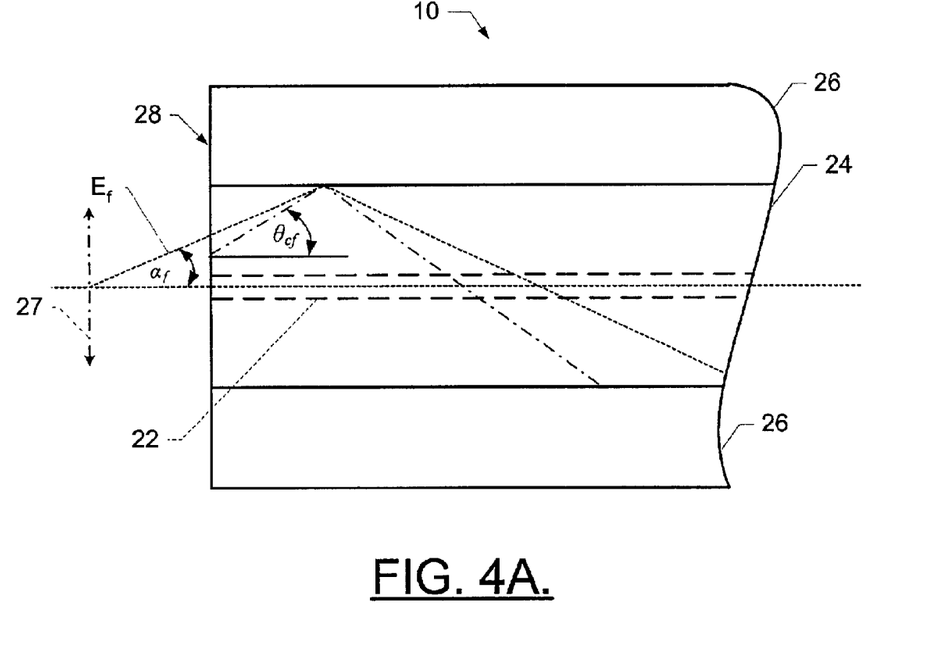
FIG. 4A is a side view of an optical fiber amplifier according to one embodiment of the present invention.
Figure 4B:
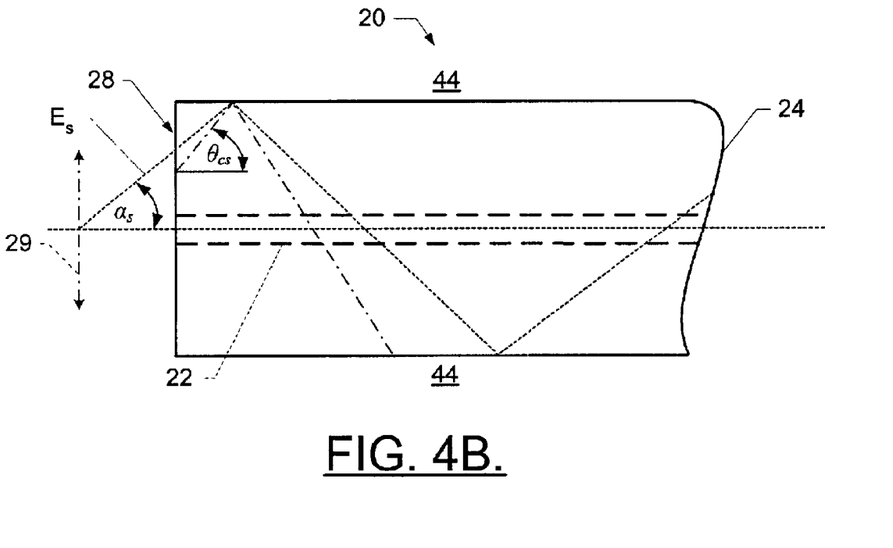
FIG. 4B is a top view of an optical fiber amplifier according to one embodiment of the present invention with the cladding layer removed.

As shown in FIG. 4A, upon entering the outer core 24 at an angle $\alpha_f$, the fast component $E_f$ of the pump energy E generally propagates both lengthwise along the dual-clad fiber and laterally across the dual-clad fiber until encountering the interface of the cladding layer 26 and the outer core within the first segment 34. In order to confine the fast component of the pump energy within the outer core, the fast component must reach the interface between the cladding layer and the outer core at an acceptance angle $\alpha_f$ that is smaller than a critical angle $\theta_{cf}$ since pump energy striking the interface at an angle more than the critical angle $\theta_{cf}$ will escape into the cladding layer. As such, the acceptance angle $\alpha_f$ must be smaller than the critical angle $\theta_{cf}$.

$$\alpha_f < \theta_{cf} \tag{3}$$

By definition, the sine of the critical angle $\theta_c$ is equal to the numerical aperture of the fiber amplifier, which at the junction of the outer core and the cladding layer is equal to the first numerical aperture, $NA_1$, as shown above in equation (1). By using the first numerical aperture to determine the critical angle $\theta_{cf}$ for the first segment of the fiber amplifier, the range of acceptable angles $\alpha_f$ can be readily determined.

As shown in FIG. 4B, upon entering the outer core at an angle $\alpha_s$, the slow component $E_s$ of the pump energy E generally propagates both lengthwise along the dual-clad fiber and laterally across the dual-clad fiber until encountering the interface of the cladding layer 26 and the material 44 within the second segment 36. In order to confine the slow component of the pump energy within the outer core, the slow component must reach the interface between the cladding layer and the outer core at an acceptance angle $\alpha_s$ that is smaller than a critical angle $\theta_{cs}$ since pump energy striking the interface at an angle greater than the critical angle $\theta_{cs}$ will escape into the material. As such, the acceptance angle $\alpha_s$ must be smaller than the critical angle $\theta_{cs}$:

$$\alpha_s < \theta_{cs} \qquad (4)$$

Like before, the sine of the critical angle $\theta_c$ is equal to the numerical aperture of the fiber amplifier. In this regard, at the junction of the outer core and the material, the numerical aperture is equal to the second numerical aperture, $NA_2$, as shown above in equation (2). By using the second numerical aperture to determine the critical angle $\theta_{cs}$ for the second segment of the fiber amplifier, the range of acceptable angles $\alpha_s$ can be readily determined.

To more readily illustrate the benefits of the anisotropic numerical aperture provided by the fiber amplifier 20 of the present invention, consider an outer core 24 with a refractive index, $N_p$, equal to 1.45, and a cladding layer 26 with a refractive index, $N_{cl}$, equal to 1.38. Further, consider the material 44 interfacing the outer core in the second section 36 comprising air, which has a refractive index, $N_m$, equal to 1. According to equation (1), the first numerical aperture, $NA_1$, of the fiber amplifier, in the first section 34, can be calculated to equal 0.445. And as the critical angle $\theta_{cf}$ equals the sine of the first numerical aperture, the critical angle $\theta_{cf}$ can be calculated to equal 26.4 degrees. Thus, the fast component of the pump energy can impinge the pump face 28 of the fiber amplifier at any angle less than 26.4 degrees to thereby propagate within the outer core.

In a conventional dual-clad fiber with the cladding layer uniformly surrounding the outer core, the slow component of the pump energy would require an angle of incidence with the pump face of the fiber amplifier at an angle less than 26.4 degrees to propagate within the outer core. In contrast, according the fiber amplifier 20 of the present invention, the second numerical aperture, $NA_2$, of the fiber amplifier 20 in the second section 36 can be calculated based on equation (2) to equal approximately 1.0. And the critical angle $\theta_{cs}$ can be calculated to equal approximately 90 degrees. As such, according to the present invention, the slow component of the pump energy can impinge the pump face 28 of the fiber amplifier at virtually any angle to thereby propagate within the outer core since an angle of 90 degrees from the pump face normal would equate to the plane of the pump face.

In addition to the embodiment illustrated in FIGS. 2–4, the fiber amplifier 20 of the present invention can comprise any one of a number of alternative configurations in which the fiber amplifier has an anisotropic numerical aperture. In this regard, attention is now drawn to FIGS. 5A and 5B, which illustrate two alternative embodiments of the fiber amplifier of the present invention. As shown, the outer core 24 at least partially surrounds the inner core 22 and, as before, generally supports the propagation of multiple modes of pump energy E. Also, as before, the fiber amplifier includes a cladding layer 26 that at least partially surrounds the outer core. The fiber amplifier also defines the first axis and 30 and the second axis 32 through the inner core 22 and the outer core 24. Additionally, the fiber amplifier may be considered to include first and second mutually exclusive segments 34 and 36 which include and surround the first and second orthogonal axes, respectively.

Figure 5A:
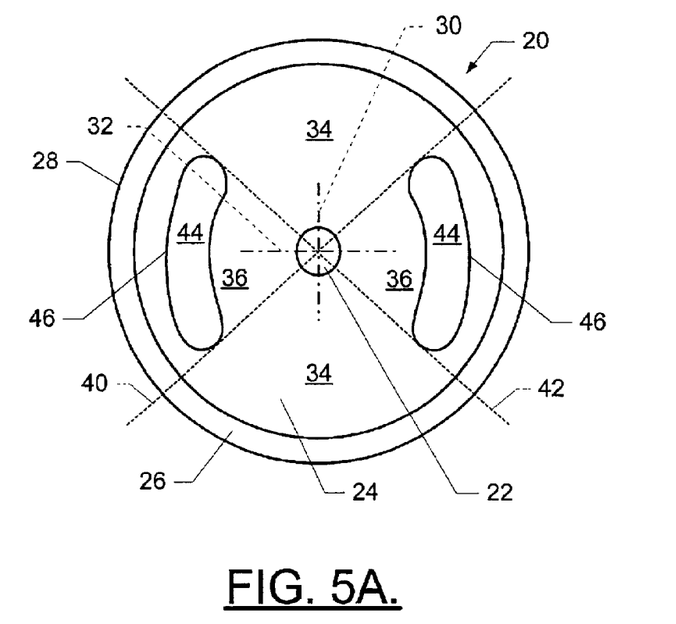
FIGS. 5A and 5B are front views of alternative embodiments of an optical fiber amplifier according to the present invention.
Figure 5B:
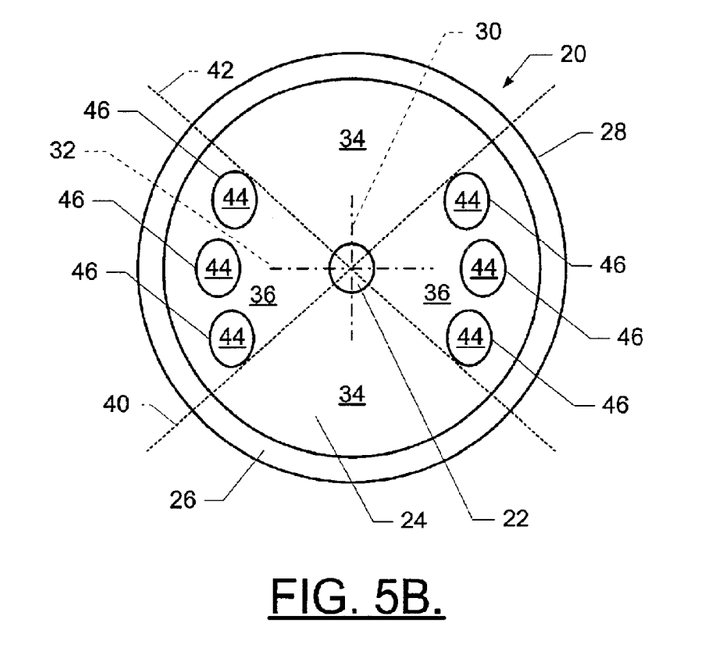

In contrast to the embodiment illustrated in FIGS. 2–4, the cladding layer 26 at least partially, and preferably totally, surrounds the outer core 24 in the second segment 36 of the fiber amplifier 20. As such, to provide the anisotropic numerical aperture, the material 44 is disposed within and, thus interfaces with, the outer core within the second segment. The material can be disposed within the outer core in any one of a number of different manners but, in a preferred embodiment, the outer core defines a plurality of voids 46, within which the material is disposed. Although not necessary for operation of the present invention, the voids are preferably arranged radially in the outer core within the second segment on opposite sides of the inner core. As shown, the number of voids can vary from one void on each side of the inner core, as shown in FIG. 5A, to multiple voids on each side of the inner core, as shown in FIG. 5B.

The voids 46, including the material 44, are arranged in the second segment 36 of the fiber amplifier 20 such that the slow component $E_s$ of the pump energy E is confined within second segment differently than the fast component $E_f$ of the pump energy is confined within the first segment 34. In this regard, the material is arranged such that the effective numerical aperture $NA_2$ within the second segment differs from the numerical aperture $NA_1$ within the first segment. While the numerical aperture in the second segment may not be uniform in all configurations of the voids due to the possibility of portions of the slow component propagating in between voids, the effective numerical aperture in the second segment will generally be greater than the numerical aperture in the first segment.

It should also be pointed out that, according to both a conventional dual-clad fiber amplifier (see FIG. 1) as well as the fiber amplifier of the present invention, the inner and outer cores of the fiber amplifier are generally cooled by transferring heat to the cladding layer. The conventional fiber amplifier will experience uniform cooling around the circumference of the outer core and, as such, the conventional fiber amplifier will tend to exhibit radial thermal gradients within the fiber amplifier. In contrast, the fiber amplifier of the present invention, and particularly the embodiment illustrated in FIGS. 2–4, experiences rather linear cooling within the first segment of the fiber amplifier. As such, the fiber amplifier of the present invention will tend to exhibit more linear thermal gradients in the direction of the first axis within the first segment. The linear thermal gradients, in turn, generate more linear stress-strain fields that allow the pump energy to propagate with linear polarization in a direction either parallel to the first axis or the second axis, with a preferred direction of polarization for the pump energy being parallel to the first axis. The preferred direction of polarization can, in turn, provide additional operational benefits for many applications.

In addition to the increase in efficiency provided by the anisotropic numerical aperture, the fiber amplifier 20 of the present invention can include additional design enhancements over conventional dual-clad fiber amplifiers to further increase the efficiency of coupling the pump energy E into the outer core 24. For example, with reference to FIG. 6, U.S. patent application Ser. No. 09/740,370 entitled: *Fiber Amplifier Having a Prism for Efficient Coupling of Pump Energy*, filed Dec. 19, 2000, describes a fiber amplifier including a prism for coupling pump energy into the outer core of the fiber amplifier. As disclosed by U.S. patent application Ser. No. 09/740,370, the contents of which are hereby incorporated by reference in their entirety, the cladding layer 26 defines at least one cladding opening 48 through which the outer core is exposed.

Figure 6:
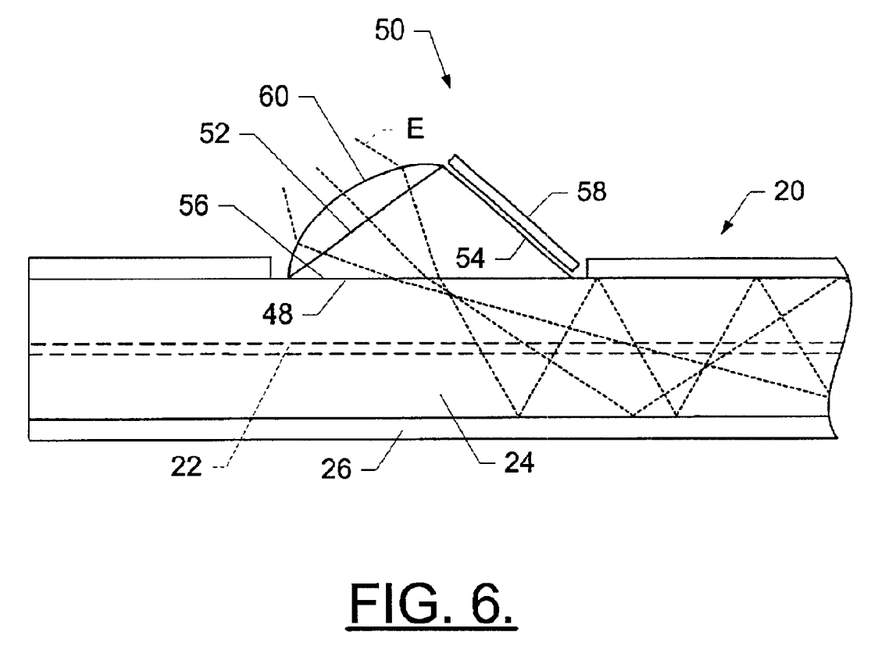
FIG. 6 is a cross-sectional view of a prism coupled optical fiber amplifier with an anisotropic numerical aperture according to one embodiment of the present invention.

Disposed within the cladding opening 48 is a prism 50 that has a pump face 52, an exit face 54, and a support face 56. The prism is positioned such that the support face is proximate the outer core 24, while the pump and exit faces extend outwardly therefrom. In operation, pump energy E is injected through the pump face of the prism and into the outer core for propagation lengthwise along the dual-clad fibers. Additionally, to reduce the loss of pump rays from the fiber amplifier, a reflective surface 58 can be disposed adjacent to the exit face to provide back reflection of pump rays exiting the prism back into the fiber amplifier. Further, the prism can include an integral cylinder lens 60 disposed on the pump face of the prism. The integral cylinder lens provides additional focus to the pump energy, particularly the fast component of the pump energy, as it enters the prism.

The fiber amplifier of the present invention therefore provides an anisotropic numerical aperture to thereby efficiently couple pump energy into the fiber amplifier. As pump energy propagates, portions of the pump energy diverge in a fast direction and in a slow direction. The anisotropic numerical aperture of the fiber amplifier of the present invention more efficiently couples the pump energy diverging in the slow direction into the fiber amplifier. And with conventional techniques of coupling the pump energy diverging in the fast direction, the fiber amplifier of the present invention couples pump energy into the pump core more efficiently than conventional techniques.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber amplifier comprising:
   a longitudinally extending inner core capable of transmitting signals;
   an outer core surrounding said inner core and extending longitudinally therealong, wherein said outer core is capable of transmitting pump energy such that the pump energy at least partially amplifies signals propagating through said inner core, wherein said outer core is capable of accepting pump energy within a first range of acceptance angles in a first direction and within a second range of acceptance angles in a second direction that is perpendicular to the first direction; and
   a cladding layer at least partially surrounding said outer core, wherein said outer core and said cladding layer are structured such that a numerical aperture of the fiber amplifier in the first direction is different than the numerical aperture of the fiber amplifier in the second direction.

2. A fiber amplifier comprising:
   a longitudinally extending inner core capable of transmitting signals;
   an outer core surrounding said inner core and extending longitudinally therealong, wherein said outer core is capable of transmitting pump energy such that the pump energy at least partially amplifies signals propagating through said inner core, wherein said outer core is capable of accepting pump energy within a first range of acceptance angles in a first direction and within a second range of acceptance angles in a second direction that is perpendicular to the first direction; and
   a cladding layer at least partially surrounding said outer core, wherein said outer core and said cladding layer are structured such that a numerical aperture of the fiber amplifier in the first direction is different than the numerical aperture of the fiber amplifier in the second direction,
   wherein the fiber amplifier defines first and second orthogonal axes extending through said inner core and in the first and second directions, respectively, wherein the fiber amplifier includes first and second mutually exclusive segments which include and surround first and second orthogonal axes, respectively, and wherein said outer core within the second segment of the fiber amplifier at least partially interfaces with a material that has a refractive index different than the refractive index of said cladding.

3. A fiber amplifier according to claim 2, wherein said cladding layer is disposed entirely within the first segment.

4. A fiber amplifier according to claim 2, wherein the material has a refractive index smaller than the refractive index of said outer core and the refractive index of said cladding layer.

5. A fiber amplifier according to claim 2, wherein the material is disposed radially within said outer core in at least two locations on opposite sides of said inner core.

6. A fiber amplifier comprising:
   a longitudinally extending inner core capable of transmitting signals;
   an outer core surrounding said inner core and extending longitudinally therealong, wherein said outer core is capable of transmitting pump energy such that the pump energy at least partially amplifies signals propagating through said inner core, wherein said outer core is capable of accepting pump energy within a first range of acceptance angles in a first direction and within a second range of acceptance angles in a second direction that is perpendicular to the first direction; and
   a cladding layer at least partially surrounding said outer core, wherein said outer core and said cladding layer are structured such that a numerical aperture of the fiber amplifier in the first direction is different than the numerical aperture of the fiber amplifier in the second direction,
   wherein a portion of the pump energy diverges in the first direction and a portion of the pump energy diverges in the second direction, wherein a portion of the pump energy diverges in the first and second directions prior to being accepted by said outer core, and wherein the portion of pump energy that diverges in the second direction diverges more than the portion of pump energy that diverges in the first direction.

7. A fiber amplifier comprising:
   a longitudinally extending inner core capable of transmitting signals;
   an outer core surrounding said inner core and extending longitudinally therealong, wherein said outer core is capable of transmitting pump energy such that the pump energy at least partially amplifies signals propagating through said inner core, wherein said outer core is capable of accepting pump energy within a first range of acceptance angles in a first direction and within a second range of acceptance angles in a second direction that is perpendicular to the first direction;

a cladding layer at least partially surrounding said outer core, wherein said outer core and said cladding layer are structured such that a numerical aperture of the fiber amplifier in the first direction is different than the numerical aperture of the fiber amplifier in the second direction, and wherein said cladding layer defines at least one opening through which said outer core is exposed; and at least one prism disposed within a respective opening defined by said cladding layer and extending laterally outward therefrom, wherein said outer core is capable of accepting pump energy through said at least one prism.

8. A fiber amplifier according to claim 7, wherein said at least one prism comprises a first face disposed proximate said outer core, a second face through which pump energy is injected, said second face extending outwardly from one end of said first face at an acute angle therefrom, and a third face extending outwardly from one end of said first face at an acute angle from said first face, and further comprising a reflective surface dispose proximate said third face.

9. A fiber amplifier according to claim 7, wherein said at least one prism comprises a first face disposed proximate said outer core, a second face extending outwardly from one end of said first face at an acute angle therefrom, and a third face extending outwardly from one end of said first face at an acute angle from said first face, and wherein said second face comprises an integral tens for directing pump energy entering said prism through said second face.

10. A fiber amplifier comprising:
a longitudinally extending inner core;
an outer core surrounding said inner core and extending longitudinally therealong; and
a cladding layer at least partially surrounding said outer core, wherein said outer core and said cladding layer are structured such that a numerical aperture of the fiber amplifier in a first direction is different than the numerical aperture of the fiber amplifier in a second direction.

11. A fiber amplifier according to claim 10, wherein the first direction is perpendicular to the second direction, and wherein said inner and outer cores extend in a longitudinal direction perpendicular to both the first and second directions.

12. A fiber amplifier comprising:
a longitudinally extending inner core;
an outer core surrounding said inner core and extending longitudinally therealong; and
a cladding layer at least partially surrounding said outer core, wherein said outer core and said cladding layer are structured such that a numerical aperture of the fiber amplifier in a first direction is different than the numerical aperture of the fiber amplifier in a second direction, wherein the first direction is perpendicular to the second direction, and wherein said inner and outer cores extend in a longitudinal direction perpendicular to both the first and second direction,
wherein the fiber amplifier defines first and second orthogonal axes extending through said inner core and in the first and second directions, respectively, wherein the fiber amplifier includes first and second mutually exclusive segments which include and surround the first and second orthogonal axes, respectively, wherein said outer core within the second segment of the fiber amplifier at least partially interfaces with a material that has a refractive index different than the refractive index of said cladding.

13. A fiber amplifier according to claim 12, wherein said cladding layer is disposed entirely within the first segment.

14. A fiber amplifier according to claim 12, wherein the material is disposed radially within said outer core and within the second segment in at least two locations on opposite sides of said inner core.

15. A fiber amplifier according to claim 10, wherein the material has a refractive index smaller than the refractive index of said outer core and the refractive index of said cladding layer.

16. A fiber amplifier comprising:
a longitudinally extending inner core;
an outer core surrounding said inner core and extending longitudinally therealong; and
a cladding layer at least partially surrounding said outer core, wherein said outer core and said cladding layer are structured such that a numerical aperture of the fiber amplifier in a first direction is different than the numerical aperture of the fiber amplifier in a second direction, wherein said cladding layer defines at least one opening through which said outer core is exposed, the fiber amplifier further comprising at least one prism disposed within respective opening defined by said cladding layer and extending laterally outward therefrom, and wherein said outer core is capable of accepting pump energy through said at least one prism.

17. A fiber amplifier according to claim 16, wherein said at least one prism comprises a first face disposed proximate said outer core, a second face through which pump energy is injected, said second face extending outwardly from one end of said first face at an acute angle therefrom, and a third face extending outwardly from one end of said first face at an acute angle from said first face, and further comprising a reflective surface disposed proximate said third face.

18. A fiber amplifier according to claim 16, wherein said at least one prism comprises a first face disposed proximate said outer core, a second face extending outwardly from one end of said first face at an acute angle therefrom, and a third face extending outwardly from one end of said first face at an acute angle from said first face, and wherein said second face comprises an integral lens for directing pump energy entering said prism through said second face.

19. A fiber amplifier comprising:
a longitudinally extending inner core;
an outer core surrounding said inner core and extending longitudinally therealong, wherein said outer core includes major opposed surfaces and minor opposed surfaces; and
a cladding layer at least partially surrounding said outer core, wherein at least a portion of said cladding layer interfaces with the major opposed surfaces of said outer core to thereby define a first numerical aperture, and wherein the minor opposed surfaces of said outer core at least partially interface with a material to thereby define a second numerical aperture that is different from the first numerical aperture.

20. A fiber amplifier comprising:
a longitudinally extending inner core;
an outer core surrounding said inner core and extending longitudinally therealong, wherein said outer core includes major opposed surfaces and minor opposed surfaces; and
a cladding layer at least partially surrounding said outer core, wherein at least a portion of said cladding layer interfaces with the major opposed surfaces of said outer core thereby define a first numerical aperture, and wherein the minor opposed surfaces of said outer core at least partially innterface with a material to thereby define a second numerical aperture that is different from the first numerical aperture, wherein the fiber amplifier defines first and second orthogonal axes extending through said inner core and the major and minor opposed surfaces, respectively, wherein the fiber amplifier includes first and second mutually exclusive segments which include and surround the first and second orthogonal axes, respectively, and wherein said outer core at least partially interfaces with the material within the second segment of the fiber amplifier.

21. A fiber amplifier according to claim 20, wherein said cladding layer is disposed entirely within the first segment.

22. A fiber amplifier according to claim 19, wherein the material has a refractive index smaller than the refractive index of said outer core and the refractive index of said cladding layer.

23. A fiber amplifier comprising:

a longitudinally extending inner core;

an outer core surrounding said inner core and extending longitudinally therealong, wherein said outer core includes a material disposed therein; and a cladding layer at least partially surrounding said outer core, wherein at least a portion of said cladding layer interfaces with the said outer core to thereby define a first numerical aperture, and wherein said outer core interfaces with the material to thereby define a second numerical aperture that is different from the first.

24. A fiber amplifier according to claim 23, wherein said outer core defines a plurality of voids within which the material is disposed.

25. A fiber amplifier comprising:

a longitudinally extending inner core;

an outer core surrounding said inner core and extending longitudinally therealong, wherein said outer core includes a material disposed therein; and a cladding layer at least partially surrounding said outer core, wherein at least a portion of said cladding lever interfaces with the said outer core to thereby define a first numerical aperture, and wherein said outer core interfaces with the material to thereby define a second numerical aperture that is different from the first, wherein the fiber amplifier defines first and second orthogonal axes extending through said inner core and the major and minor opposed surfaces, respectively, wherein the fiber amplifier includes first and second mutually exclusive segments which include and surround the first and second orthogonal axes, respectively, wherein said cladding layer interfaces with said outer core within the first segment, and wherein the second segment includes the material.

26. A fiber amplifier according to claim 25, wherein said outer core defines a plurality of voids within which the material is disposed, wherein more voids are within the second segment than in the first segment.

27. A fiber amplifier according to claim 26, wherein the voids defined within said outer core in the second segment are symmetrical relative to said second axis.

28. A fiber amplifier according to claim 23, wherein the material has a refractive index smaller than the refractive index of said outer core and the refractive index of said cladding layer.

\* \* \* \* \*